(12) United States Patent
Kale et al.

(10) Patent No.: US 12,373,703 B2
(45) Date of Patent: Jul. 29, 2025

(54) ARTIFICIAL NEURAL NETWORK REMAPPING IN MEMORY

(71) Applicant: Micron Technology, Inc., Boise, ID (US)

(72) Inventors: Poorna Kale, Folsom, CA (US); Saideep Tiku, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 1130 days.

(21) Appl. No.: 17/240,412

(22) Filed: Apr. 26, 2021

(65) Prior Publication Data

US 2022/0343177 A1    Oct. 27, 2022

(51) Int. Cl.
*G06N 3/10* (2006.01)
*G06F 11/07* (2006.01)

(52) U.S. Cl.
CPC .............. *G06N 3/10* (2013.01); *G06F 11/073* (2013.01)

(58) Field of Classification Search
CPC ........ G06N 3/10; G06N 3/0464; G06N 3/063; G06F 11/073; G06F 2201/81; G06F 11/1423
USPC ....................................................... 714/6.13
See application file for complete search history.

(56) References Cited

U.S. PATENT DOCUMENTS

| | | | |
|---|---|---|---|
| 10,552,251 B2 | 2/2020 | Qin et al. | |
| 2013/0326269 A1 | 12/2013 | Losh et al. | |
| 2019/0253520 A1* | 8/2019 | Maharana | H04L 67/63 |
| 2019/0372827 A1 | 12/2019 | Vasseur et al. | |
| 2020/0026997 A1 | 1/2020 | Yang | |
| 2020/0265304 A1 | 8/2020 | Nagaraj Chandrashekar et al. | |
| 2020/0342284 A1 | 10/2020 | Buyuktosunoglu et al. | |
| 2020/0354118 A1 | 11/2020 | Sun et al. | |
| 2021/0294707 A1* | 9/2021 | Evans | G06F 11/203 |

FOREIGN PATENT DOCUMENTS

CN    111240887    6/2020

OTHER PUBLICATIONS

Lixue Xia et al., 'Fault-Tolerant Training with On-Line Fault Detection for RRAM-Based Neural Computing Systems', 2017 54th ACM/EDAC/IEEE Design Automation Conference (DAC), Oct. 9, 2017, 7 pages.
Jiemin Fang et al., 'Fast Neural Network Adaptation via Parameter Remapping and Architecture Search', Eighth International Conference on Learning Representations 2020, May 1, 2020, 14 pages.
Henne et al., "Benchmarking Uncertainty Estimation Methods for Deep Learning With Safety-Related Metrics", Feb. 7, 2020, Proceedings of the Workshop on Artificial Intelligence Safety (Safe AI 2020), 8 pgs.

* cited by examiner

*Primary Examiner* — Yair Leibovich
(74) *Attorney, Agent, or Firm* — Brooks, Cameron & Huebsch, PLLC

(57) ABSTRACT

An artificial neural network can be allocated to memory and operated. An error can occur in the memory and/or be detected in the memory. Layers of the artificial neural network can be remapped in the memory at least partially in response to the error. Performance of the artificial neural network can be evaluated before and/or after the remapping.

29 Claims, 5 Drawing Sheets

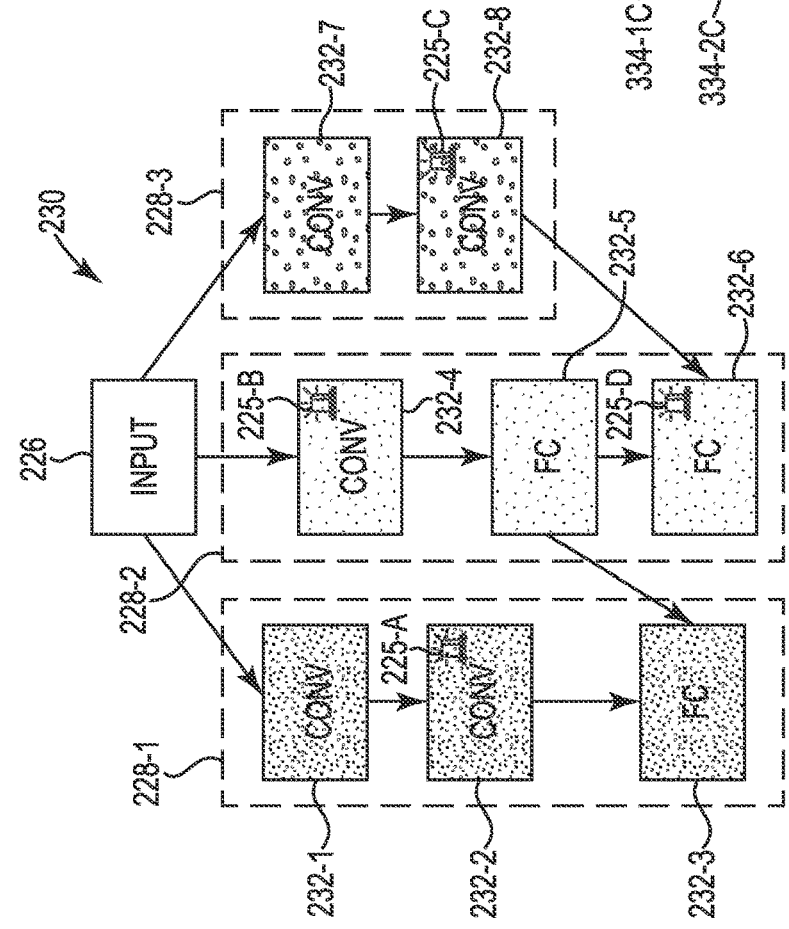
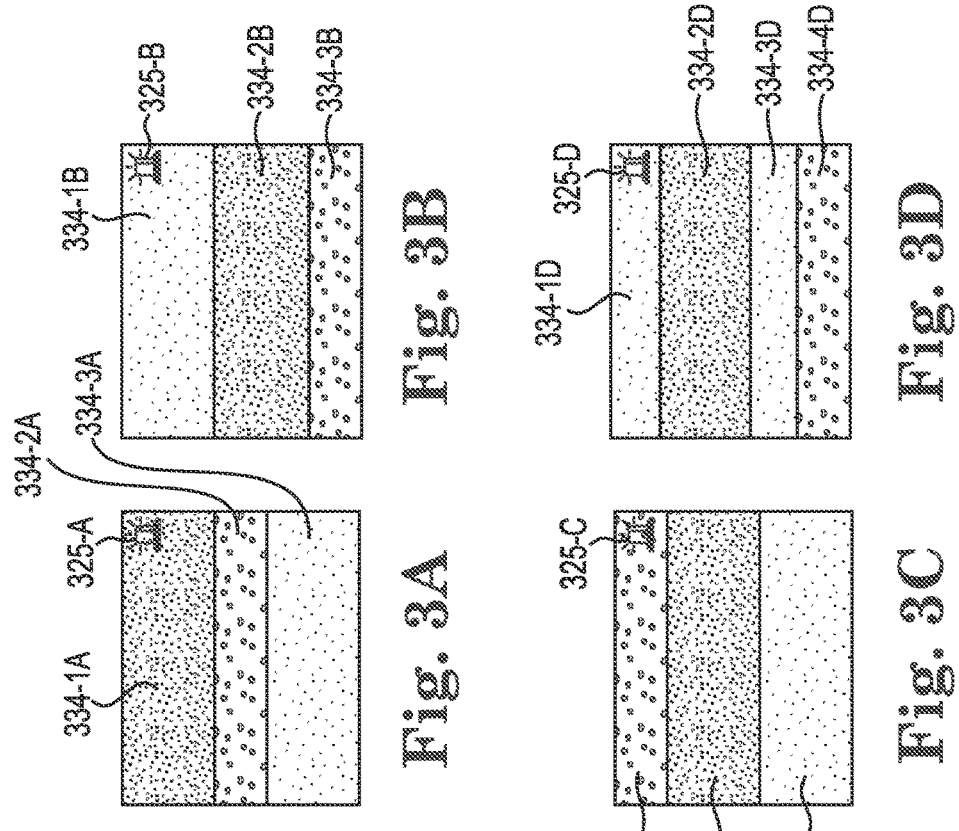

ARTIFICIAL NEURAL NETWORK REMAPPING IN MEMORY

TECHNICAL FIELD

The present disclosure relates generally to memory, and more particularly to apparatuses and methods associated with artificial neural network remapping in memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications, including, but not limited to personal computers, portable memory sticks, digital cameras, cellular telephones, portable music players such as MP3 players, movie players, and other electronic devices. Memory cells can be arranged into arrays, with the arrays being used in memory devices.

BRIEF DESCRIPTION OF THE DRAWINGS

FIG. 2 is a block diagram of an artificial neural network compute graph in accordance with a number of embodiments of the present disclosure.

FIG. 3A is a block diagram of an artificial neural network mapping in accordance with a number of embodiments of the present disclosure.

FIG. 3B is a block diagram of a first artificial neural network remapping in accordance with a number of embodiments of the present disclosure.

FIG. 3C is a block diagram of a second artificial neural network remapping in accordance with a number of embodiments of the present disclosure.

FIG. 3D is a block diagram of a third artificial neural network remapping in accordance with a number of embodiments of the present disclosure.

DETAILED DESCRIPTION

Figure 1:
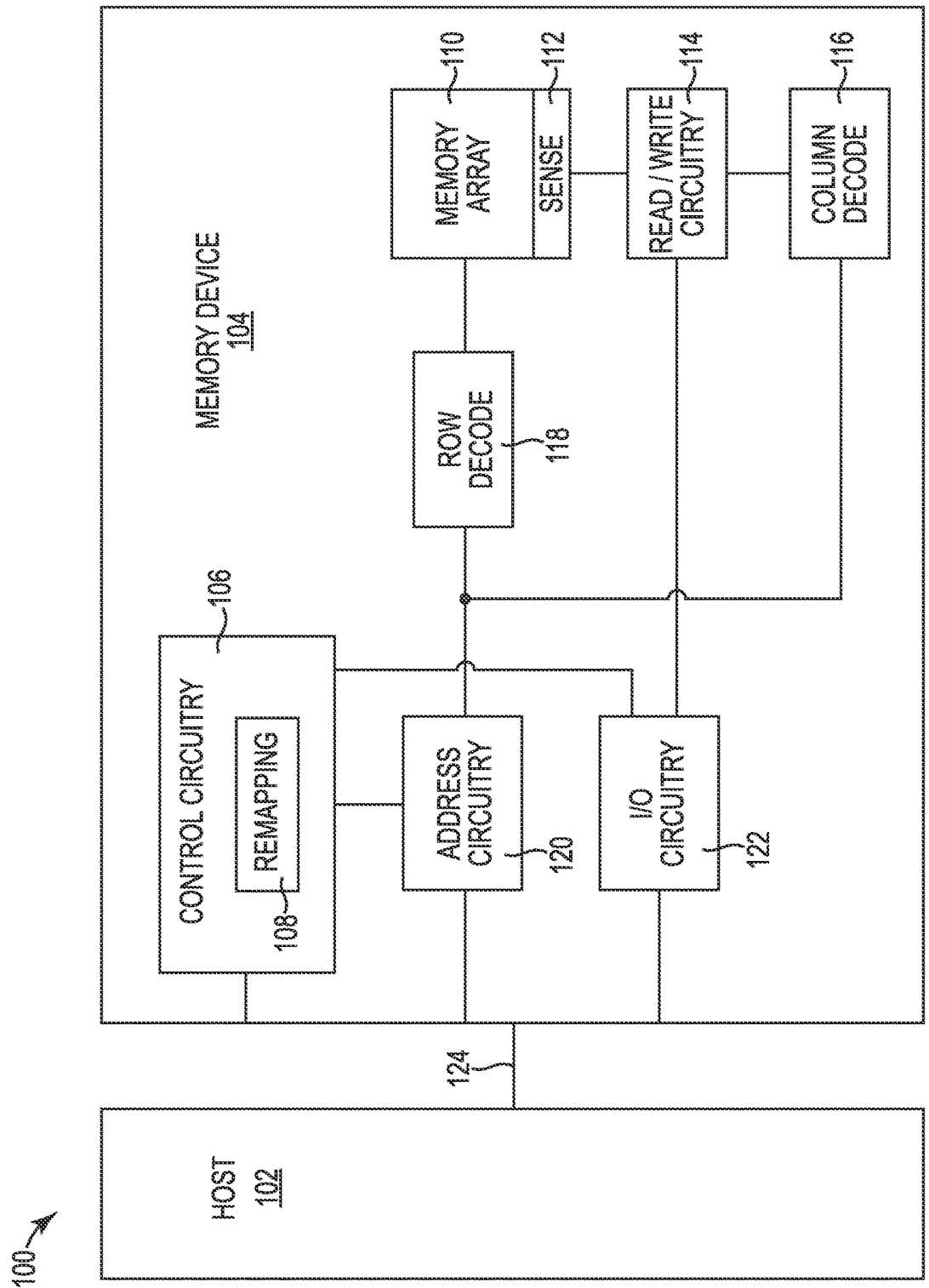
FIG. 1 is a block diagram of an apparatus in the form of a computing system including a memory device in accordance with a number of embodiments of the present disclosure.

The present disclosure includes apparatuses and methods related to artificial neural network ("ANN") remapping in memory. Remotely deployed sensors may be used with networking infrastructure (e.g., 5G networks), smart cameras, radar, equipment designed for space or subsea exploration. Such sensors can be challenging and/or expensive to repair and may face questionable mean time to failure. It is desirable for memory and compute subsystems deployed under such harsh conditions to be resilient to various sources of failure that may arise due to, for example, aging, alpha particle strikes, swift changes in environmental conditions, etc. However, failure of such systems may ultimately be inevitable. Therefore, it is desirable for memory subsystems to adapt in-situ to improve mean time to failure of the overall system.

Redundancy in memory and compute subsystems is often seen as a failsafe solution to problems associated with random bit flips and freezes in memory. However, redundancy has a significant cost. Minor errors or variations in ANNs (e.g., errors in inputs and/or weights) used with deep learning-based applications deployed in the sensing space may not always lead to erroneous results. For example, such errors may occur on non-critical compute nodes of an ANN application graph. However, if the same error persists for a given bit in memory occupied by the same weights in the ANN, there may come a time when the erroneous bit is on a critical path for the correct execution of the ANN model. Such errors may specifically bias a particular class and/or portion of an ANN application.

Aspects of the present disclosure address the above and other deficiencies. For instance, in-situ memory-aware remapping of ANN weights can be used to cause the erroneous bits to appear in different ANN compute graph locations, which can reduce a likelihood that a critical path is rendered unusable due to memory failure. The remapping can occur while the application is running. In some embodiments, the remapping can be triggered by a user remotely. In some embodiments, the remapping can be triggered automatically by mechanisms within the ANN application using, for example, uncertainty sampling metrics.

The process and/or quantity of iterations of in-situ remapping and/or retraining can depend on reliability and/or lifetime expectations for the application and/or memory subsystem. For example, networking infrastructure may have a longer lifetime expectancy but can cope with lesser accuracy. In contrast, autonomous vehicles or robots may have greater accuracy expectations with relatively lesser lifetime expectations. A host system can indicate such parameters to the memory subsystem as part of a software compilation process.

An ANN can provide learning by forming probability weight associations between an input and an output. The probability weight associations can be provided by a plurality of nodes that comprise the ANN. The nodes together with weights, biases, and activation functions can be used to generate an output of the ANN based on the input to the ANN. As used herein, artificial intelligence refers to the ability to improve a machine through "learning" such as by storing patterns and/or examples which can be utilized to take actions at a later time. Deep learning refers to a device's ability to learn from data provided as examples. Deep learning can be a subset of artificial intelligence. Artificial neural networks, among other types of networks, can be classified as deep learning.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 230 may reference element "30" in FIG. 2, and a similar element may be referenced as 430 in FIG. 4. Analogous elements within a Figure may be referenced with a hyphen and extra numeral or letter. See, for example, elements 232-1, 232-2 in FIG. 2. Such analogous elements may be generally referenced without the hyphen and extra numeral or letter. For example, elements 228-1, 228-2, 228-3 in FIG. 2 may be collectively referenced as 228. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form of a computing system 100 including a memory device in accordance with a number of embodiments of the present disclosure. The memory device 104 is coupled to a host 102 via an interface 124. As used herein, a host 102, a memory device 104, or a memory array 110, for example, might also be separately considered to be an "apparatus." The interface 124 can pass control, address, data, and other signals between the memory device 104 and the host 102. The interface 124 can include a command bus (e.g., coupled to the control circuitry 106), an address bus (e.g., coupled to the address circuitry 120), and a data bus (e.g., coupled to the input/output (I/O) circuitry 122). In some embodiments, the command bus and the address bus can be comprised of a common command/address bus. In some embodiments, the command bus, the address bus, and the data bus can be part of a common bus. The command bus can pass signals between the host 102 and the control circuitry 106 such as clock signals for timing, reset signals, chip selects, parity information, alerts, etc. The address bus can pass signals between the host 102 and the address circuitry 120 such as logical addresses of memory banks in the memory array 110 for memory operations. The interface 124 can be a physical interface employing a suitable protocol. Such a protocol may be custom or proprietary, or the interface 124 may employ a standardized protocol, such as Peripheral Component Interconnect Express (PCIe), Gen-Z interconnect, cache coherent interconnect for accelerators (CCIX), etc. In some cases, the control circuitry 106 is a register clock driver (RCD), such as RCD employed on an RDIMM or LRDIMM.

The memory device 104 and host 102 can be a satellite, a communications tower, a personal laptop computer, a desktop computer, a digital camera, a mobile telephone, a memory card reader, an Internet-of-Things (IoT) enabled device, an automobile, among various other types of systems. For clarity, the system 100 has been simplified to focus on features with particular relevance to the present disclosure. The host 102 can include a number of processing resources (e.g., one or more processors, microprocessors, or some other type of controlling circuitry) capable of accessing the memory device 104.

The memory device 104 can provide main memory for the host 102 or can be used as additional memory or storage for the host 102. By way of example, the memory device 104 can be a dual in-line memory module (DIMM) including memory arrays 110 operated as double data rate (DDR) DRAM, such as DDR5, a graphics DDR DRAM, such as GDDR6, or another type of memory system. Embodiments are not limited to a particular type of memory device 104. Other examples of memory arrays 110 include RAM, ROM, SDRAM, LPDRAM, PCRAM, RRAM, flash memory, and three-dimensional cross-point, among others. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The control circuitry 106 can decode signals provided by the host 102. The control circuitry 106 can also be referred to as a command input and control circuit and can represent the functionality of different discrete ASICs or portions of different ASICs depending on the implementation. The signals can be commands provided by the host 102. These signals can include chip enable signals, write enable signals, and address latch signals, among others, that are used to control operations performed on the memory array 110. Such operations can include data read operations, data write operations, data erase operations, data move operations, etc. The control circuitry 106 can comprise a state machine, a sequencer, and/or some other type of control circuitry, which may be implemented in the form of hardware, firmware, or software, or any combination of the three.

Data can be provided to and/or from the memory array 110 via data lines coupling the memory array 110 to input/output (I/O) circuitry 122 via read/write circuitry 114. The I/O circuitry 122 can be used for bi-directional data communication with the host 102 over an interface. The read/write circuitry 114 is used to write data to the memory array 110 or read data from the memory array 110. As an example, the read/write circuitry 114 can comprise various drivers, latch circuitry, etc. In some embodiments, the data path can bypass the control circuitry 106.

The memory device 104 includes address circuitry 120 to latch address signals provided over an interface. Address signals are received and decoded by a row decoder 118 and a column decoder 116 to access the memory array 110. Data can be read from memory array 110 by sensing voltage and/or current changes on the sense lines using sensing circuitry 112. The sensing circuitry 112 can be coupled to the memory array 110. The sensing circuitry 112 can comprise, for example, sense amplifiers that can read and latch a page (e.g., row) of data from the memory array 110. Sensing (e.g., reading) a bit stored in a memory cell can involve sensing a relatively small voltage difference on a pair of sense lines, which may be referred to as digit lines or data lines.

The memory array 110 can comprise memory cells arranged in rows coupled by access lines (which may be referred to herein as word lines or select lines) and columns coupled by sense lines (which may be referred to herein as digit lines or data lines). Although the memory array 110 is shown as a single memory array, the memory array 110 can represent a plurality of memory arrays arraigned in banks of the memory device 104. The memory array 110 can include a number of memory cells, such as volatile memory cells (e.g., DRAM memory cells, among other types of volatile memory cells) and/or non-volatile memory cells (e.g., RRAM memory cells, among other types of non-volatile memory cells).

The control circuitry 106 can also include remapping circuitry 108. In some embodiments, the remapping circuitry 108 comprises an application specific integrated circuit (ASIC) configured to perform the remapping examples described herein. In some embodiments, the remapping circuitry 108 represents functionality of the control circuitry 106 that is not embodied in separate discrete circuitry. The control circuitry 106 and/or the remapping circuitry 108 can be configured to write values to the memory array 110 according to a first logical-to-physical mapping, the values indicative of weights of an ANN. The control circuitry 106 and/or the remapping circuitry 108 can be configured to detect an error in the memory array and determine which layer is mapped to a physical location of the memory array having the error. The control circuitry 106 and/or the remapping circuitry 108 can be configured to write the values to the memory array 110 according to a second logical-to-physical mapping such that a different layer is mapped to the physical location of the memory array having the error. The control circuitry 106 and/or the remapping circuitry 108 can be configured to evaluate performance of the ANN with the first and/or the second logical-to-physical mapping and to write the values to the memory array 110 according to the second logical-to-physical mapping (or a subsequent remapping) in response to a sub-threshold result of the evaluation.

FIG. 2 is a block diagram of an ANN compute graph 230 in accordance with a number of embodiments of the present disclosure. The compute graph 230 includes an input 226 to a first computational path 228-1, a second computational path 228-2, and a third computational path 228-3. The input 226 can be analogous to the input data 440 illustrated in FIG. 4. However, in some embodiments, the input 226 represents an intermediate input (e.g., an input from one or more previous layers of an ANN) rather than input data. The first computational path 228-1 includes a first layer 232-1 (illustrated as a convolution layer "CONV"), a second layer 232-2, and a third layer 232-3 (illustrated as a fully connected layer "FC"). Although the types of layers are illustrated as examples, the specific operation of each layer is not necessarily relevant to the described embodiments. The second computational path 228-2 includes a fourth layer 232-4, a fifth layer 232-5, and a sixth layer 232-6. The third computational path includes a seventh layer 232-7 and an eighth layer 232-8. Although three computational paths 228 and eight layers 232 are illustrated, one of skill in the art will appreciate that a compute graph 230 for operation of an ANN can have many more layers and/or computational paths. Two additional computational paths are illustrated, but not specifically labeled. A first of which runs the input 226 to the fourth layer 232-4 to the fifth layer 232-5 and to the third layer 232-3. A second of which runs from the input 226 to the seventh layer 232-7 to the eighth layer 232-8 and to the sixth layer 232-6. Unlike the two additional computational paths, each of the first computational path 228-1, second computational path 228-2, and third computational path 228-3 run independently of each other as indicated by the different shading of the respective layers 232 in FIG. 2.

The input 226 can be data that the ANN is designed to perform an operation with respect to, such as classify, identify, analyze, etc. Non-limiting examples of such input data include images, video, and patterns. The input 226 data can be represented as a matrix. A convolution layer can be represented as a matrix of lesser dimensionality than the input data. A convolution layer can perform a convolution operation on a portion of the input 226 proportional to the convolution layer. A convolution layer can be analogized to an image filter that scans a few pixels at a time to create a feature map that predicts a class to which each feature belongs, for example. A convolution layer can output a result of the convolution to another layer. A fully connected layer can take the results of other layers as input and use them to classify, identify, or analyze the input 226. Fully connected layers in series (e.g., fifth layer 232-5 to sixth layer 232-6) can first take the output of previous layers and "flatten" the output to a single vector that can be input to a subsequent stage, take inputs from feature analysis and apply weights to predict a correct label, and give final probabilities for each label. The label is the result of the classification, identification, or analysis performed by the ANN. Additional detail regarding the operation of an ANN is provided below with respect to FIG. 4.

An error 225 (e.g., "bit error") is illustrated as occurring in different layers 232. As illustrated in FIG. 2, the error 225 represents a point in the compute graph of the ANN that is mapped to a physical location in memory that has an error. The example illustrated in FIG. 2 shows one error 225, with four different mappings of the error 225-A, 225-B, 225-C, 225-D. The error 225-A first appears in the second layer 232-2 based on an initial mapping of the ANN to physical memory. The initial mapping of the ANN can include values written to the physical memory. The values can be indicative of weights and/or biases of the ANN. If the error 225 is detected in the physical memory, control circuitry can determine to which layer the error is mapped. For the initial mapping, it would be determined that the error 225-A is mapped to the second layer 232-2. The values can be rewritten to the physical memory according to a second logical-to-physical mapping such that a different layer (e.g., fourth layer 232-4) is mapped to the physical location of the memory having the error 225-B. After a second remapping, the error 225-C appears in the eighth layer 232-8. After a third remapping, the error 225-D occurs in the sixth layer 232-6. Each of the representations of the error 225-A, 225-B, 225-C, 225-D represent the same error 225 at different times and corresponding to different mappings. The designations "A", "B", "C", and "D" correspond to the mappings illustrated in FIGS. 3A-3D respectively.

In some embodiments, the ANN can be remapped such that the error 225 is mapped to a different computational path 228. As illustrated in FIG. 2 for the initial mapping, the error 225-A corresponds to the first computational path 228-1 because it is mapped to the second layer 232-2. For the first remapping, the error 225-B corresponds to the second computational path 228-2 because it is mapped to the fourth layer 232-4. For the second remapping, the error 225-C corresponds to the third computational path 228-3 because it is mapped to the eighth layer 232-8. Such embodiments can be useful in trying to find a computational path 232 that is less critical that others for the given error 225. Performance of the ANN can be evaluated with the error 225 mapped to different computational paths 228 to determine a relationship between the mapping of the error 225 to the different computational paths 228 and the performance of the ANN. In at least one embodiment, after determining the performance of different mappings of the error 225 to different computational paths 228, one of the mappings providing a best performance of the ANN can be selected and mapped accordingly for future operation of the ANN.

In various embodiments, the ANN can be remapped such that the error 225 is mapped to a computational path 228 to which it was mapped in any previous mapping. As illustrated in FIG. 2 for the third remapping, the error 225-D is again mapped to the second computational path 228-2. Such embodiments can be useful in trying to find a layer 232 within a computational path 232 that is less critical that others for the given error 225. The error 225 can be mapped to different layers 232 within a particular computational path 228 and performance of the neural network can be evaluated for each mapping to determine a relationship between the mapping of the error 225 to the different layers 232 and the performance of the ANN. In at least one embodiment, after determining the performance of different mappings of the error 225 to different layers 232, one of the mappings providing a best performance of the ANN can be selected and mapped accordingly for future operation of the ANN.

After a particular quantity of remappings (e.g., a predefined quantity) the ANN can be retrained. Retraining is described in more detail with respect to FIG. 4. In some embodiments, the ANN can be retrained regardless of whether performance evaluations have occurred or what the results of any performance evaluations are once the particular quantity of remappings has occurred. In some embodiments, the ANN can be retrained after the particular quantity of remappings has occurred and also in response to a sub-threshold results of a performance evaluation of at least one of the mappings (e.g., a last one of the remappings, all of the remappings, etc.). Retraining the ANN can be more resource intensive than remapping the ANN, so it may be desirable to attempt to address any errors 225 via remapping first. The particular quantity of remappings can be set based on a reliability or lifetime expectation of the ANN and/or a system that implements the ANN, such as a remote system.

FIGS. 3A-3D represent portions of a physical memory that have the layers of the computational paths illustrated in FIG. 2 mapped thereto. FIG. 3A represents an initial mapping with an error 325-A at a particular physical location in the memory (e.g., a memory cell). Although FIGS. 3B-3D illustrate different mappings of the layers to the physical memory, the location of the error 325 does not change. Rather, different layers are mapped to it.

FIG. 3A is a block diagram of an ANN mapping in accordance with a number of embodiments of the present disclosure. The layers 232-1, 232-2, 232-3 of the first computational path 228-1 illustrated in FIG. 2 are mapped to a first portion of memory 334-1A illustrated in FIG. 3A. The first portion of the memory 334-1A includes the error 325-A. Correspondingly, the layer 232-2 illustrated in FIG. 2 includes the error 225-A. The layers 232-7, 232-8 of the third computational path 228-3 illustrated in FIG. 2 are mapped to a second portion of memory 334-2A. The layers 232-4, 232-5, 232-6 of the second computational path 228-2 illustrated in FIG. 2 are mapped to a third portion of memory 334-3A illustrated in FIG. 3A. The network mapping illustrated in FIG. 3A represents an initial mapping of the ANN to memory.

FIG. 3B is a block diagram of a first ANN remapping in accordance with a number of embodiments of the present disclosure. The network mapping illustrated in FIG. 3B represents a first remapping of the ANN to memory. The layers 232-1, 232-2, 232-3 of the first computational path 228-1 illustrated in FIG. 2 are mapped to a second portion of memory 334-2B illustrated in FIG. 3B. The layers 232-4, 232-5, 232-6 of the second computational path 228-2 illustrated in FIG. 2 are mapped to a first portion of memory 334-1B illustrated in FIG. 3B. The first portion of the memory 334-1B includes the error 325-B (the same error as the error 325-A illustrated in FIG. 3A), Correspondingly, the layer 232-4 illustrated in FIG. 2 includes the error 225-B. The layers 232-7, 232-8 of the third computational path 228-3 illustrated in FIG. 2 are mapped to a third portion of memory 334-3B.

FIG. 3C is a block diagram of a second ANN remapping in accordance with a number of embodiments of the present disclosure. The network mapping illustrated in FIG. 3C represents a second remapping of the ANN to memory. The layers 232-1, 232-2, 232-3 of the first computational path 228-1 illustrated in FIG. 2 are mapped to a second portion of memory 334-2C illustrated in FIG. 3C. The layers 232-4, 232-5, 232-6 of the second computational path 228-2 illustrated in FIG. 2 are mapped to a third portion of memory 334-3C illustrated in FIG. 3C. The layers 232-7, 232-8 of the third computational path 228-3 illustrated in FIG. 2 are mapped to a first portion of memory 334-1C. The first portion of the memory 334-1C includes the error 325-C (the same error as the error 325-A illustrated in FIG. 3A and the error 325-B illustrated in FIG. 3B). Correspondingly, the layer 232-8 in FIG. 2 is illustrated as including the error 225-C.

FIG. 3D is a block diagram of a third ANN remapping in accordance with a number of embodiments of the present disclosure. The network mapping illustrated in FIG. 3D represents a third remapping of the ANN to memory. The layers 232-1, 232-2, 232-3 of the first computational path 228-1 illustrated in FIG. 2 are mapped to a second portion of memory 334-2D illustrated in FIG. 3D. The layers 232-4, 232-5, 232-6 of the second computational path 228-2 illustrated in FIG. 2 are mapped to a first portion of memory 334-1D and a third portion of the memory 334-3D illustrated in FIG. 3D. The first portion of the memory 334-1D includes the error 325-D (the same error as the error 325-A illustrated in FIG. 3A, the error 325-B illustrated in FIG. 3B, and the error 325-C illustrated in FIG. 3C). Correspondingly, the layer 232-6 in FIG. 2 is illustrated as including the error 225-D. The layers 232-7, 232-8 of the third computational path 228-3 illustrated in FIG. 2 are mapped to a fourth portion of memory 334-4D.

Some approaches to addressing errors in memory with respect to the operation of an ANN may include the use of redundant memory. For example, if a block of memory has an error, use of that block of memory may be discontinued and it can effectively be replaced with a redundant block of memory. Such approaches may be referred to as overprovisioning the ANN with memory. However, such approaches are inefficient in terms of the cost to implement the ANN and the physical size of the device used to implement the ANN. In contrast, at least one embodiment of the present disclosure allows for errors in memory to be addressed without relying on redundant memory. For example, as illustrated in FIGS. 3A-3D, the physical portion (e.g., block) of memory containing the error 325 is still used to implement the ANN in each remapping rather than being excluded and replaced with redundant memory.

In some embodiments, before each remapping, performance of the ANN can be evaluated. Such performance evaluation is described in more detail with respect to FIG. 4. The ANN can be remapped in response to a sub-threshold result of the performance evaluation. For embodiments in which the ANN is operated on a remote device, the threshold for the evaluation can be predefined. In some embodiments, the threshold can be user-defined or determined by a user in response to being presented with the results.

Figure 4:
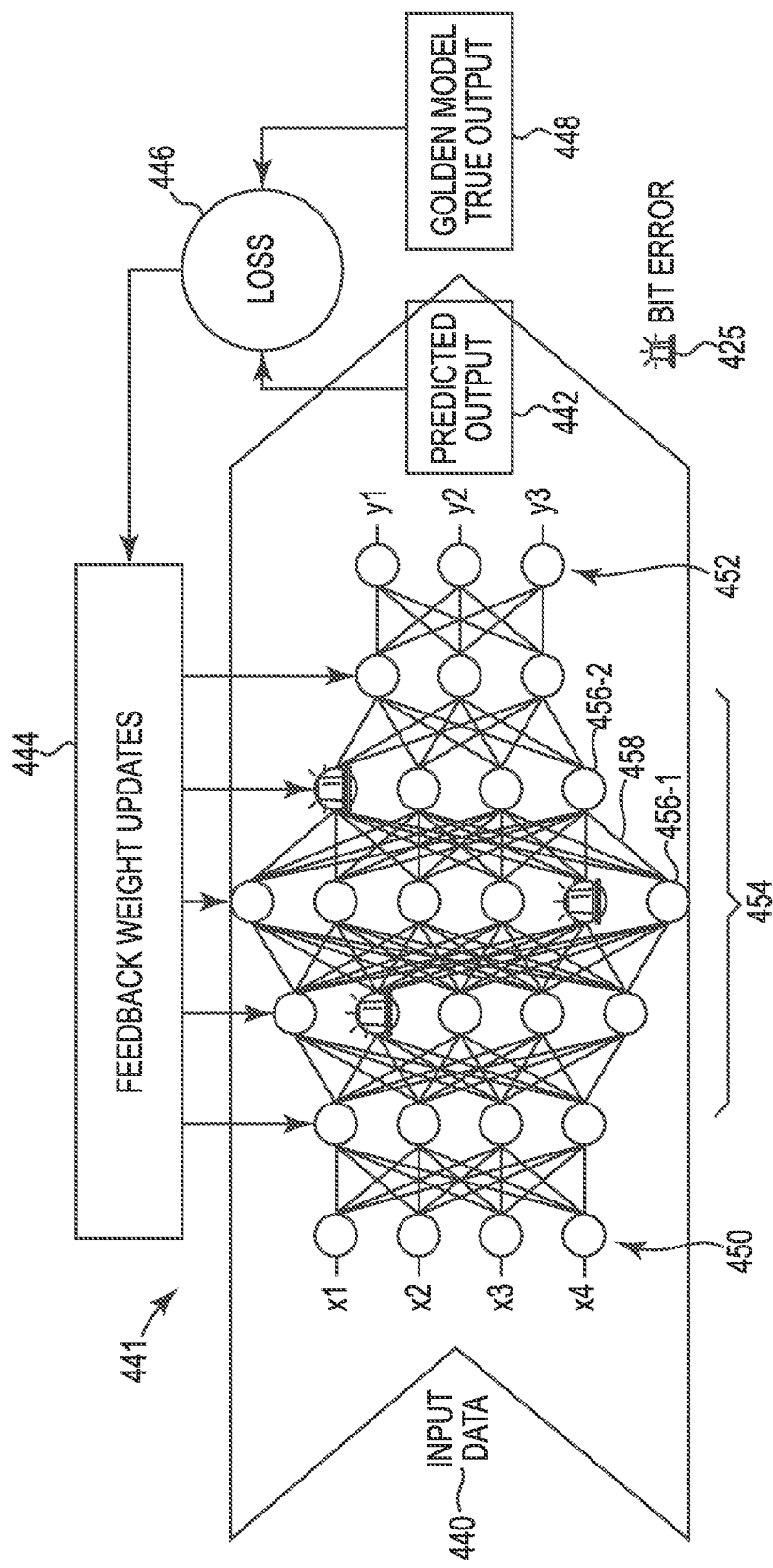
FIG. 4 is a flow diagram for artificial neural network retraining in accordance with a number of embodiments of the present disclosure.

FIG. 4 is a flow diagram for ANN 441 retraining in accordance with a number of embodiments of the present disclosure. The ANN 441 can receive input data 440 and can generate an output 442, which can be referred to as a predicted output because it is a prediction of the result of the classification, identification, or analysis performed on the input data 440 by the ANN 441. Examples of the output 442 include an identification of an object in an image, where the image is the input data 440. The ANN 441 can include layers of nodes 456 including an initial or input layer 450 and a final or output layer 452 with intermediate layers 454 therebetween. The input data 440 can be input to the nodes of the input layer 450. The nodes 456 of the output layer 452 can provide signals that represent the output 442 of the ANN 441.

Each node 456 of the ANN 441 can be coupled to adjacent nodes 456. For example, a first node 456-1 can be coupled to a second node 456-2, as illustrated. Signals can be provided from the nodes of a previous layer to connected nodes of a subsequent layer (left to right as illustrated). For example, a signal can be provided from the first node 456-1 to the second node 456-2 and the connection 458 therebetween can be assigned a weight. In some embodiments, each connection in the ANN 441 can have an individual weight assigned thereto.

A node 456 can provide (or not provide) an input signal to each of the nodes to which it is coupled. For a given pair of coupled nodes, that signal can be combined with a weight assigned to the connection therebetween. For example, a weight assigned to the connection 458 between the first node 456-1 and the second node 456-2 can be combined with the corresponding signal sent from the first node 456-1 to the second node 456-2. For example, the weight can be multiplied with the signal provided from the first node 456-1 to the second node 456-2. A given node 456 can have a quantity of inputs thereto from a corresponding quantity of nodes coupled thereto. The node 456 can sum the product of the signals input thereto and the corresponding weights assigned to the connections. A bias can be added to the sum. The addition (e.g., sum of the bias and the sum of the product of the signals and the corresponding weights) can be performed by the nodes 456. The result of the addition can be used in an activation function to determine whether the corresponding node will provide a signal to each of the nodes to which the corresponding node is coupled.

A topology of the ANN 441 describes the coupling of the nodes 456. The topology of the ANN 441 also describes the quantity of nodes 441. The topology of the ANN 441 further describes the layers 450, 454, 452 of the ANN 441 and/or the quantity of the layers 450, 454, 452.

To evaluate performance of the ANN 441, modeled data can be used as the input data 440. Such modeled data can be referred to as a "golden model". If the ANN 441 is functioning properly, the golden model should cause the ANN 441 to generate a known output 448 (e.g., "golden model true output"). The known output 448 can be stored in advance of operation of the ANN 441. The actual output 442 of the ANN 441 operating on the golden model as input data 440 can be compared to the known output 448 to evaluate performance of the ANN 441.

The result of the performance evaluation can be the difference 446 (e.g., "loss") between the output 442 and the known output 448. The difference 446 can be compared to a threshold value to determine whether the ANN 441 has sub-threshold (e.g., unacceptable) performance. In response to a sub-threshold performance evaluation, the ANN 441 can be retrained 444. Retraining can include updating the weights and/or the biases of the ANN 441.

An error 425 (e.g., "bit error") is illustrated, which corresponds to the error 225 in FIG. 2 and 325 in FIGS. 3A-3D. The error 425 is shown as appearing in various nodes 456. This is intended to illustrate that different mappings, described herein, can result in a physical error in the memory being mapped to different layers of the ANN 441. The error 425 can more specifically be mapped to different nodes 456 within a given layer.

The error 425 introduced into the ANN 441 can be based on the type of a memory device to which the ANN 441 is allocated. Different types of memory devices can experience different types of errors and/or can experience different quantities of errors at a given age of the memory device. The error 425 can take the form of a modification to the weights, biases, nodes, and/or layers, among other characteristics of the ANN 441. For example, the error 441 can cause a modification in the ANN 441 to an intended value of a weight and/or bias. In some instances, the error 425 may cause a node and/or layer to be unintentionally added to or removed from the ANN 441.

Figure 5:
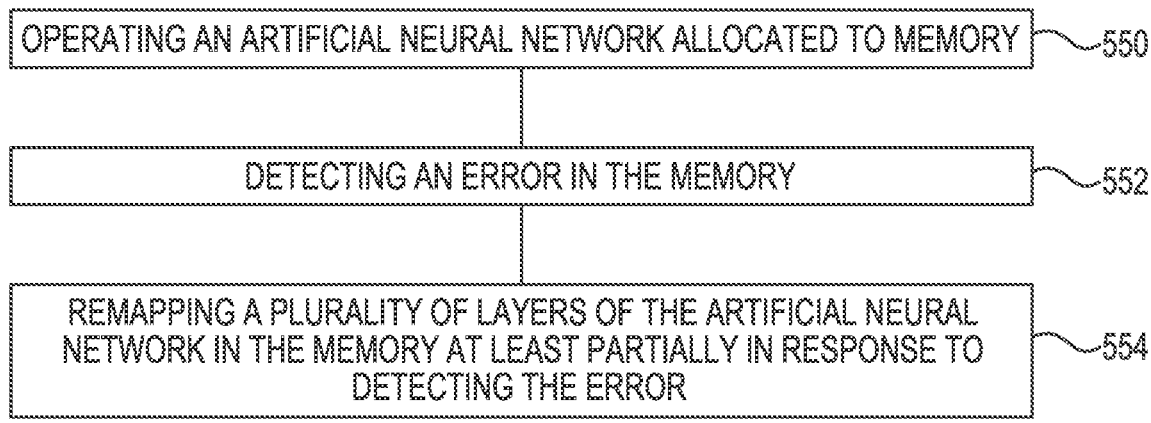
FIG. 5 is a flow diagram of a method for artificial neural network remapping in memory in accordance with a number of embodiments of the present disclosure.

FIG. 5 is a flow diagram of a method for ANN remapping in memory in accordance with a number of embodiments of the present disclosure. The method can be performed by processing logic that can include hardware (e.g., a processing device, circuitry, dedicated logic, programmable logic, microcode, hardware of a device, integrated circuit, etc.), software (e.g., instructions run or executed on a processing device), or a combination thereof. In some embodiments, the method is performed by the control circuitry (e.g., control circuitry 106 illustrated in FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 550, the method can include operating an ANN allocated to memory. The ANN being allocated to memory means that values representing elements of the ANN (e.g., weights, biases, layers, topology, etc.) are stored in a memory array of a memory device. The elements of the ANN can be represented as bit strings comprised of logic values. The ANN can be modified by modifying the logic values of a corresponding bit string. Operating the ANN can include writing values to the memory according to a first logical-to-physical mapping, the values indicative of weights of the ANN. The logical-to-physical mapping is of addresses of the values where the logical addresses are those associated with the neural network (e.g., as assigned by a host) and the physical addresses are those of the memory device to which the values are stored. The ANN can include computational paths (e.g., the computational paths 228 illustrated in FIG. 2), each traversing at least two layers of the ANN.

At block 552, the method can include detecting an error in the memory. For example, the error can be detected by error detection circuitry, such as a cyclic redundancy check engine. However, in some embodiments, the error may not be detected so specifically. For example, the presence of an error may be detected or inferred by performance degradations of the ANN. Examples of errors include bit errors and bit freezes. A bit error is the result of a memory cell being unreadable or storing incorrect data. Bit errors can be caused defects in the memory cell, defects in the programming process, or other phenomena. A bit freeze is the result of a memory cell being programmed to a particular state and that state not being changeable (e.g., erasable or reprogrammable). A bit freeze can be the result of aging, overprogramming, or other phenomena. Errors in the memory (e.g., in a memory cell) can cause the value (e.g., weight) stored in a memory cell (or group of memory cells) to be read incorrectly, which may cause the ANN to produce unexpected, incorrect, and/or unreliable results. The magnitude or effect (if any) of the error can be dependent upon where in the ANN the error occurs.

At block 554, the method can include remapping layers of the ANN in the memory at least partially in response to detecting the error. Advantageously, the remapping can be performed while the ANN is being operated. For example, the ANN can continue to be used to classify, identify, and/or analyze inputs while the underlying elements of the ANN are being remapped in memory. In contrast, the ANN would cease operating during the retraining process (e.g., because the underlying elements would be changed during the retraining process, thus changing the operation of the ANN).

Remapping can move the error within the ANN and may result in a reduced magnitude or effect of the error on the performance of the ANN. Remapping can include writing the values (the same values) to the memory according to a second logical-to-physical mapping, different than the first logical to physical mapping. Remapping does not include changing the values of the ANN or correcting any detected errors in the data (values) stored in the memory. In some embodiments, the second logical-to-physical mapping can cause the error to be associated with a different computational path than the first logical-to-physical mapping.

Although not specifically illustrated, the method can include performing more than one remapping of the layers of the ANN in the memory. The additional remappings can include writing the values (the same values) to the memory according to respective different logical-to-physical mappings. Each different logical-to-physical mapping can cause the error to be associated with a different computational path than the previous logical-to-physical mappings. In at least one embodiment, a predefined quantity of remappings can be performed and then the ANN can be retrained.

Although not specifically illustrated, the method can include evaluating performance of the ANN after remapping (e.g., after each remapping). A subsequent remapping can be initiated in response to the evaluation yielding a sub-threshold result. In some embodiments, such remapping can occur without user input, which can be beneficial for implementations of the ANN in remotely deployed devices. In some embodiments, this remapping and performance evaluation process can continue up to the predefined quantity of remappings, after which retraining is initiated. For some ANNs, it may be that performance degradation can be caused by one or more errors in memory and remapping the ANN may improve the performance. The remapping moves the error to a different location in the topology of the ANN, which may prevent a critical path in the ANN from being affected by the error, thereby improving performance.

In at least one embodiment, remapping may be performed at least partially in response to user input. For example, the remapping may be directed by the user, or the remapping may be prompted by the detection of the error and then the user may be prompted for input to authorize the remapping operation.

Figure 6:
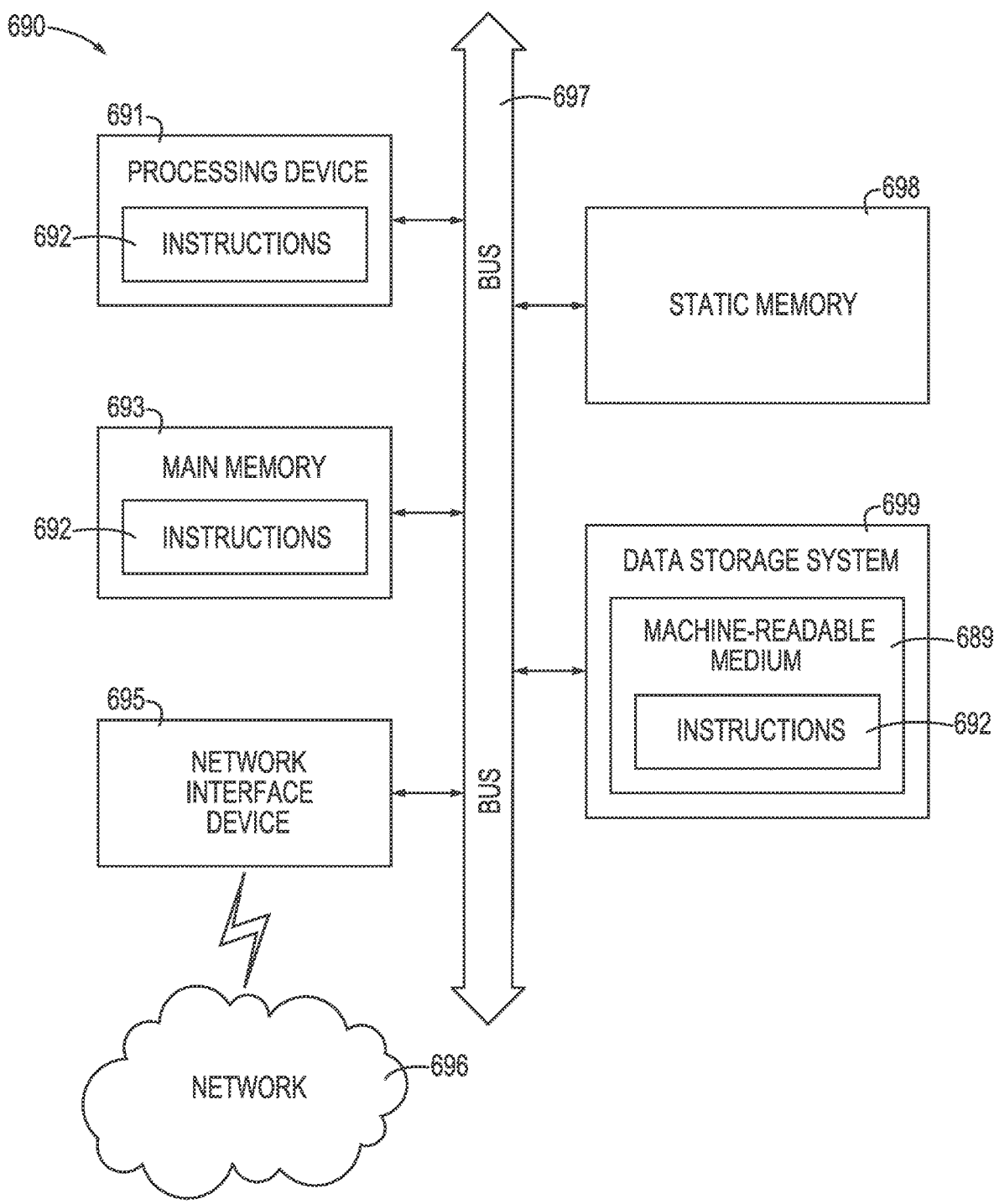
FIG. 6 illustrates an example computer system within which a set of instructions, for causing the machine to perform various methodologies discussed herein, can be executed.

FIG. 6 illustrates an example computer system 690 within which a set of instructions, for causing the machine to perform various methodologies discussed herein, can be executed. In various embodiments, the computer system 690 can correspond to a system (e.g., the computing system 100 of FIG. 1) that includes, is coupled to, or utilizes a memory sub-system (e.g., the memory device 104 of FIG. 1) or can be used to perform the operations of control circuitry. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 690 includes a processing device 691, a main memory 693 (e.g., read-only memory (ROM), flash memory, dynamic random access memory (DRAM) such as synchronous DRAM (SDRAM) or Rambus DRAM (RDRAM), etc.), a static memory 697 (e.g., flash memory, static random access memory (SRAM), etc.), and a data storage system 699, which communicate with each other via a bus 697.

The processing device 691 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 691 can also be one or more special-purpose processing devices such as an application specific integrated circuit (ASIC), a field programmable gate array (FPGA), a digital signal processor (DSP), network processor, or the like. The processing device 691 is configured to execute instructions 692 for performing the operations and steps discussed herein. The computer system 690 can further include a network interface device 695 to communicate over the network 696.

The data storage system 699 can include a machine-readable storage medium 689 (also known as a computer-readable medium) on which is stored one or more sets of instructions 692 or software embodying any one or more of the methodologies or functions described herein. The instructions 692 can also reside, completely or at least partially, within the main memory 693 and/or within the processing device 691 during execution thereof by the computer system 690, the main memory 693 and the processing device 691 also constituting machine-readable storage media.

In at least one embodiment, the instructions 692 include instructions to implement functionality corresponding to the host 102 and/or the memory device 104 of FIG. 1. The instructions 692 can be executed to cause the machine to operate an ANN allocated to memory, receive a report of an error in the memory, and cause layers of the ANN to be remapped in the memory such that a different layer is mapped to a physical location of the memory array having the error. The layers can be remapped while the ANN is being operated. The instructions 692 can be executed to cause the machine to evaluate performance of the ANN after the remapping, cause a further remapping in response to a sub-threshold result of the performance evaluation of the ANN after the remapping, and operate the ANN with the remapping in response to threshold performance of the ANN after the remapping. The instructions 692 can be executed to evaluate performance of the ANN in response to receiving the report of the error and to cause the remapping in response to a sub-threshold result of the performance evaluation of the ANN before the remapping. The instructions 692 can be executed to cause the ANN to be retrained in response to a sub-threshold result of a performance evaluation of the ANN after a predefined quantity of remappings. In at least one embodiment, the instructions 692 can be executed to prompt a user for authorization to cause the remapping.

While the machine-readable storage medium 689 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    operating an artificial neural network allocated to memory;
    detecting an error in the memory; and
    remapping a plurality of layers of the artificial neural network in the memory at least partially in response to detecting the error;
    wherein remapping the plurality of layers comprises remapping while operating the artificial neural network.

2. The method of claim 1, wherein operating the artificial neural network comprises writing values to the memory according to a first logical-to-physical mapping, the values indicative of weights of the artificial neural network; and
    wherein remapping the plurality of layers comprises writing the values to the memory according to a second logical-to-physical mapping.

3. The method of claim 2, wherein the artificial neural network includes a plurality of computational paths, each of the plurality of computational paths traversing at least two respective layers of the plurality of layers; and
    wherein the second logical-to-physical mapping causes the error to be associated with a different computational path than the first logical-to-physical mapping.

4. The method of claim 1, further comprising performing a quantity of remappings of the plurality of layers by writing the values to the memory according to respective different logical-to-physical mappings;
    wherein each different logical-to-physical mapping causes the error to be associated with a different computational path than previous logical-to-physical mappings.

5. The method of claim 4, further comprising retraining the artificial neural network after the quantity of remappings.

6. The method of claim 1, further comprising evaluating performance of the artificial neural network after the remapping; and
    initiating a subsequent remapping in response to the evaluation yielding a sub-threshold result.

7. The method of claim 1, wherein remapping the plurality of layers further comprises remapping at least partially in response to a user input.

8. The method of claim 1, further comprising evaluating performance of the artificial neural network prior to remapping; and
    wherein remapping the plurality of layers further comprises remapping without user input at least partially in response to a result of the evaluation.

9. The method of claim 1, wherein detecting the error comprises detecting a bit error or bit freeze in the memory.

10. An apparatus, comprising:
    a memory array; and
    control circuitry coupled to the memory array and configured to:
        write values to the memory array according to a first logical-to-physical mapping, the values indicative of weights of an artificial neural network;
        detect an error in the memory array;
        determine a first layer of the artificial neural network that is mapped to a physical location of the memory array having the error; and
        write the values to the memory array according to a second logical-to-physical mapping such that a second layer is mapped to the physical location of the memory array having the error.

11. The apparatus of claim 10, wherein the control circuitry is further configured to evaluate performance of the artificial neural network with the first logical-to-physical mapping; and write the values to the memory array according to the second logical-to-physical mapping in response to a sub-threshold result of the evaluation.

12. The apparatus of claim 11, wherein the control circuitry is further configured to evaluate performance of the artificial neural network with the second logical-to-physical mapping; and
write the values to the memory array according to a third logical-to-physical mapping such that a third layer is mapped to the physical location of the memory array having the error in response to a sub-threshold result of the evaluation with the second logical-to-physical mapping.

13. The apparatus of claim 12, wherein the first layer, the second layer, and the third layer each correspond to a different respective computational path of the artificial neural network.

14. The apparatus of claim 12, wherein at least two of the first layer, the second layer, and the third layer correspond to a same computational path of the artificial neural network.

15. The apparatus of claim 10, wherein the control circuitry is further configured to write the values to the memory array according to a plurality of successive different logical-to-physical mappings such that a different layer is mapped to the physical location of the memory array having the error for each successive mapping.

16. The apparatus of claim 15, wherein the control circuitry is further configured to retrain the artificial neural network in response to the plurality of successive different mappings reaching a particular quantity of mappings.

17. The apparatus of claim 16, wherein the apparatus is part of remote system; and
wherein the particular quantity of mappings is set based on a reliability or lifetime expectation of the remote system.

18. The apparatus of claim 15, wherein the control circuitry is further configured to:
evaluate performance of the artificial neural network with each successive mapping; and
retrain the artificial neural network in response to a sub-threshold result of the evaluation for a predefined quantity of the successive mappings.

19. A non-transitory machine-readable medium having computer-readable instructions, which when executed by a machine, cause the machine to:
operate an artificial neural network allocated to memory;
receive a report of an error in the memory;
cause a plurality of layers of the artificial neural network to be remapped to a first remapping in the memory such that a different layer of a plurality of layers of the artificial neural network is mapped to a physical location of the memory having the error;
evaluate performance of the artificial neural network after the first remapping;
cause a second remapping in response to a sub-threshold result of the performance evaluation of the artificial neural network after the first remapping; and
operate the artificial neural network with the first remapping in response to a threshold result of the performance evaluation of the artificial neural network after the first remapping.

20. The medium of claim 19, further comprising instructions to:
evaluate performance of the artificial neural network in response to receiving the report of the error; and
cause the plurality of layers of the artificial neural network to be remapped to a preemptive remapping in response to a sub-threshold result of a performance evaluation of the artificial neural network before the first remapping.

21. The medium of claim 19, wherein any instructions to cause the plurality of layers to be remapped comprise instructions to cause the plurality of layers to be remapped while the artificial neural network is being operated.

22. The medium of claim 19, further comprising instructions to cause the artificial neural network to be retrained in response to a sub-threshold result of a performance evaluation of the artificial neural network after a predefined quantity of remappings.

23. The medium of claim 19, further comprising instructions to prompt a user for authorization to cause the first remapping.

24. A method, comprising:
operating an artificial neural network allocated to memory, wherein operating the artificial neural network comprises writing values to the memory according to a first logical-to-physical mapping, the values indicative of weights of the artificial neural network;
detecting an error in the memory; and
remapping a plurality of layers of the artificial neural network in the memory at least partially in response to detecting the error, wherein remapping the plurality of layers comprises writing the values to the memory according to a second logical-to-physical mapping.

25. The method of claim 24, wherein the artificial neural network includes a plurality of computational paths, each of the plurality of computational paths traversing at least two respective layers of the plurality of layers; and
wherein the second logical-to-physical mapping causes the error to be associated with a different computational path than the first logical-to-physical mapping.

26. A method, comprising:
operating an artificial neural network allocated to memory;
detecting an error in the memory;
remapping a plurality of layers of the artificial neural network in the memory at least partially in response to detecting the error; and
performing a quantity of remappings of the plurality of layers by writing the values to the memory according to respective different logical-to-physical mappings;
wherein each different logical-to-physical mapping causes the error to be associated with a different computational path than previous logical-to-physical mappings.

27. The method of claim 26, further comprising retraining the artificial neural network after the quantity of remappings.

28. A method, comprising:
operating an artificial neural network allocated to memory;
detecting an error in the memory;
remapping a plurality of layers of the artificial neural network in the memory at least partially in response to detecting the error;
evaluating performance of the artificial neural network after the remapping; and
initiating a subsequent remapping in response to the evaluation yielding a sub-threshold result.

29. A method, comprising:
operating an artificial neural network allocated to memory;
detecting an error in the memory;

remapping a plurality of layers of the artificial neural network in the memory at least partially in response to detecting the error; and evaluating performance of the artificial neural network prior to remapping;

wherein remapping the plurality of layers further comprises remapping without user input at least partially in response to a result of the evaluation.

* * * * *